(12) United States Patent
Moberg et al.

(10) Patent No.: US 8,412,182 B2
(45) Date of Patent: Apr. 2, 2013

(54) SCHEDULING OF UPLINK MEASUREMENT REPORTS

(75) Inventors: Peter Moberg, Stockholm (SE); Anders Furuskär, Stockholm (SE); Eva Englund, Linkoping (SE); Mats Sågfors, Kyrkslatt (FI); Ying Sun, Sundbyberg (SE); Krister Norlund, Gothenburg (SE); Kelvin Malati, Marsta (SE); Gunnar Peters, Stockholm (SE); Christian Skärby, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 287 days.

(21) Appl. No.: 12/918,269

(22) PCT Filed: Mar. 20, 2008

(86) PCT No.: PCT/SE2008/050321
§ 371 (c)(1),
(2), (4) Date: Aug. 18, 2010

(87) PCT Pub. No.: WO2009/116908
PCT Pub. Date: Sep. 24, 2009

(65) Prior Publication Data
US 2011/0009116 A1    Jan. 13, 2011

(51) Int. Cl.
*H04W 24/00* (2009.01)
(52) U.S. Cl. .......... 455/425; 455/450; 370/280
(58) Field of Classification Search .......... 455/557, 455/452.1, 435; 439/69; 348/594; 370/465; 713/100; 345/173
See application file for complete search history.

(56) References Cited

U.S. PATENT DOCUMENTS

| | | | |
|---|---|---|---|
| 2003/0114170 A1* | 6/2003 | Rick et al. | 455/456 |
| 2005/0064890 A1* | 3/2005 | Johan et al. | 455/522 |
| 2008/0004030 A1* | 1/2008 | Frederiksen et al. | 455/450 |
| 2008/0123570 A1* | 5/2008 | Yin | 370/280 |
| 2008/0214197 A1* | 9/2008 | Englund et al. | 455/450 |
| 2008/0293423 A1* | 11/2008 | Park et al. | 455/450 |
| 2009/0111383 A1* | 4/2009 | Eckert et al. | 455/67.11 |
| 2009/0119564 A1* | 5/2009 | Sagfors et al. | 714/748 |

FOREIGN PATENT DOCUMENTS

| | | |
|---|---|---|
| EP | 1 816 883 | 2/2006 |
| EP | 1 833 203 | 3/2006 |
| EP | 1 816 883 A1 | 8/2007 |
| EP | 1 833 203 A1 | 9/2007 |
| WO | WO 2007/066883 | 6/2007 |
| WO | WO 2007/066883 A1 | 6/2007 |

OTHER PUBLICATIONS

International Search Report, PCT International Application No. PCT/SE2008/050321, Feb. 5, 2009.
International Preliminary Report on Patentability corresponding to PCT/SE2008/050321, Date of Issuance: Sep. 21, 2010.

* cited by examiner

*Primary Examiner* — Mahendra Patel
(74) *Attorney, Agent, or Firm* — Myers Bigel Sibley & Sajovec, P.A.

(57) ABSTRACT

In a wireless communication system, the uplink transmission of measurement reports may be scheduled based on an estimated time of when a measurement report will be ready for transmission. The estimated time may be calculated at a base station or user equipment.

18 Claims, 14 Drawing Sheets

SCHEDULING OF UPLINK MEASUREMENT REPORTS

CROSS REFERENCE TO RELATED APPLICATIONS

This application is a 35 U.S.C. §371 national stage application of PCT International Application No. PCT/SE2008/050321, filed on Mar. 20, 2008, the disclosure and content of which is incorporated by reference herein in its entirety. The above-referenced PCT International Application was published in the English language as International Publication No. WO 2009/116908 A1 on Sep. 24, 2009.

TECHNICAL FIELD

Implementations described herein relate generally to uplink scheduling in wireless communication systems.

BACKGROUND

A base station uses measurement reports for providing handover services to user equipment. Typically, when a user equipment has measurement reports to transmit to a base station, some form of scheduling takes place between the user equipment and the base station. In this regard, a certain amount of radio signaling between the base station and the user equipment occurs, which translates into delay and utilization of resources. In some instances, the resulting delay can be detrimental, particularly since measurement reports are time-sensitive, relate to radio connectivity and impact the quality of service provided to the user equipment.

SUMMARY

It is an object to obviate at least some of the above disadvantages and to improve the operability of devices within a wireless communication system.

A method for scheduling link quality measurement reports associated with one or more cells of a wireless network may be characterized by estimating a time at which a first link quality measurement report will be available at a user equipment, and scheduling transmission of the first link quality measurement report from the user equipment to a base station based on the estimated time.

A system, implemented in a base station associated with a wireless network, for scheduling link quality measurement reports associated with one or more cell of the wireless network may be characterized by a unit configured to estimate a time at which a link quality measurement report will be available at a user equipment. The unit may also be configured to initiate a transmission, just prior to the estimated time, a grant of uplink resources from the base station to the user equipment to enable the user equipment to transmit the link quality measurement report to the base station on an uplink channel.

A system, implemented in user equipment associated with a wireless network, for scheduling link quality measurement reports associated with one or more cells of the wireless network may be characterized by an estimator configured to estimate a time at which a first link quality measurement report will be available for transmission from the user equipment, and a unit configured to initiate the transmission of an uplink resource request just prior to the estimated time from the user equipment to the base station. The unit may also be configured to initiate the transmission of the first link quality measurement report to the base station based on whether an uplink grant is received at the user equipment in response to the uplink resource request.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description refers to the accompanying drawings. The same reference numbers in different drawings may identify the same or similar elements. Also, the following description does not limit the invention.

The concepts described herein relate to a wireless communication system. A wireless communication system is intended to be broadly interpreted to include any type of wireless network, such as cellular or mobile networks (e.g., Global System for Mobile Communications (GSM), Universal Mobile Telecommunications Systems (UMTS), Long Term Evolution (LTE), Code Division Multiple Access 2000 (CDMA2000). Ultra Mobile Broadband (UMB), etc.), or other types of wireless networks. In this regard, while the detailed description to follow may refer to a particular architecture (e.g., a network architecture or a device architecture) or a particular communication standard, the concepts described herein should not be construed as being dependent on such an architecture or communication standard. Rather, it will be appreciated that the concepts described herein are not platform dependent and may be implemented within a wide variety of architectures or communication standards, etc., in addition to those specifically mentioned herein. The term "communication standard," as used herein, is intended to be broadly interpreted to include any wireless communication standard (e.g., LTE, GSM, etc.) and/or a version thereof. The term "wireless network," as used herein, is intended to be broadly interpreted to include one or more devices capable of wirelessly communicating with one or more other devices.

Implementations described herein provide for scheduling and transmittal of measurement reports in a manner that may, among other things, reduce delays, the utilization of resources, and/or improve service, as well as other advantages that may necessarily flow therefrom or are apparent from the description that follows. In one or more of the embodiments described, messages (e.g., requests or grants) may be transmitted in a proactive or a persistent manner that may, among other things, reduce the number of messages in a scheduling procedure and/or reduce a time period in which messages are exchanged and measurement reports may be transmitted.

Figure 1:
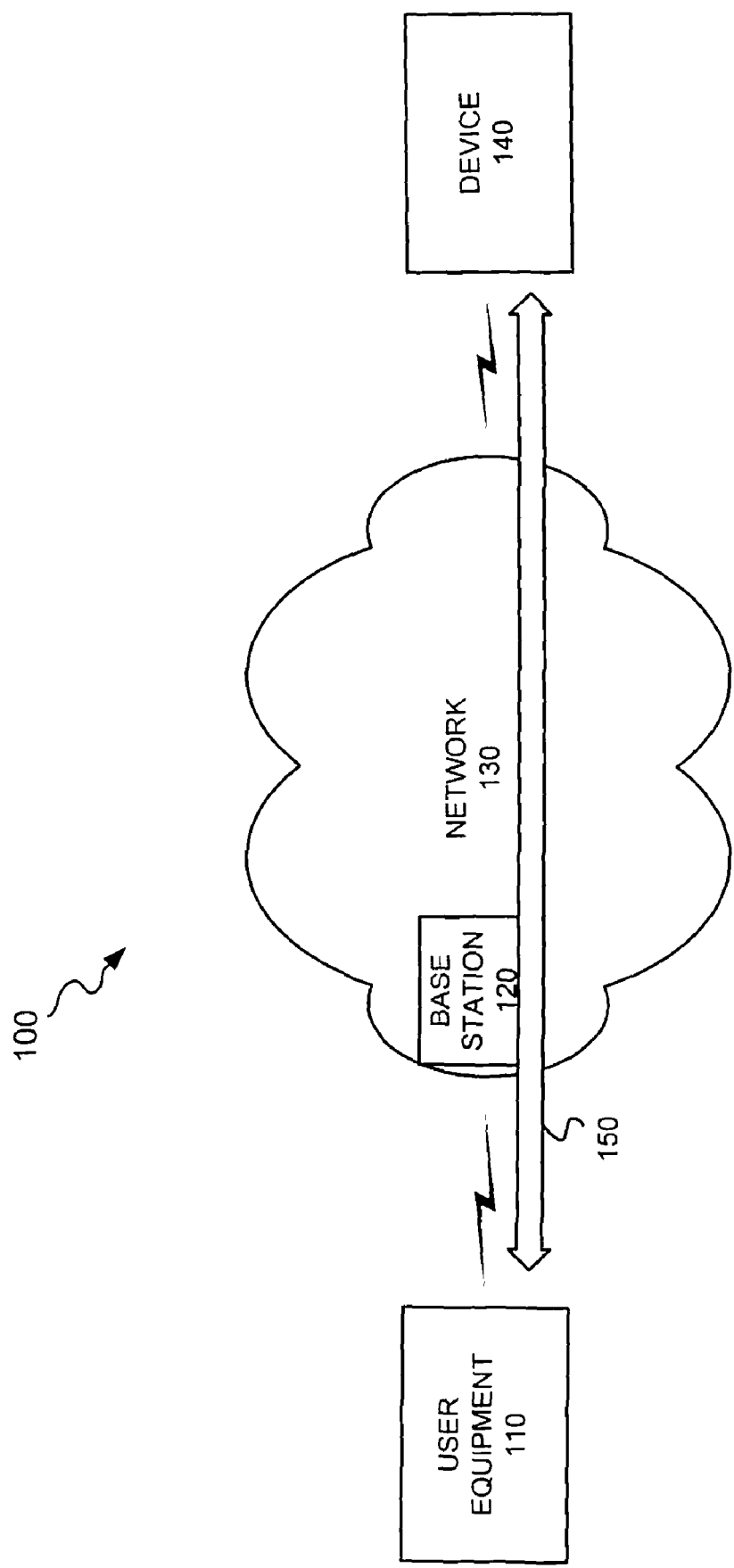
FIG. 1 illustrates devices communicating with one another via an intermediate device in a communication system.

FIG. 1 illustrates devices communicating with one another in a wireless communication system 100. As illustrated in FIG. 1, user equipment (UE) 110 may communicate with another device 140 via a network 130. Network 130 may include, among other things, a device that acts as an intermediate device between UE 110 and device 140 and facilitates an end-to-end communication link 150 between UE 110 and device 140. The intermediate device is capable of communicating with UE 110 in a wireless manner. In one implementation, the intermediate device may include a base station (BS) 120. The term "base station," as used herein, is intended to be broadly interpreted to include any type of station that may communicate with UE 110 via a wireless link. For example, a base station may include, a base transceiver station (BTS) in a GSM system, an eNodeB in a LTE system, a Node B in a UMTS system, etc. Additionally, or alternatively, a base station may include a repeater, a relay, and/or some other type of wireless station that performs one or more operations in a communication system.

UE 110 may include a mobile terminal such as a cellular radiotelephone, a personal digital assistant (PDA), a Personal Communications Systems (PCS) terminal, a laptop computer, a palmtop computer, or any other type of device or appliance that includes a communication transceiver that permits the device to communicate with other devices via a wireless link. A PCS terminal may combine a cellular radiotelephone with data processing, facsimile and data communications capabilities. A PDA may include a radiotelephone, a pager, Internet/intranet access, a web browser, an organizer, calendars and/or a global positioning system (GPS) receiver. UE 110 may be referred to as a "pervasive computing" device. In some implementations, device 140 may also include a mobile terminal.

Network 130 may include (in addition to the intermediate device) one or more networks of any type, including a local area network (LAN), a wide area network (WAN), a metropolitan area network (MAN), a telephone network, such as the Public Switched Telephone Network (PSTN) or a Public Land Mobile Network (PLMN), a satellite network; an intranet, the Internet; or a combination of networks. The PLMN may include a packet-switched network, such as, for example, a General Packet Radio Service (GPRS) network, a Cellular Digital Packet Data (CDPD) network, or Mobile Internet Protocol (IP) network.

Figure 2:
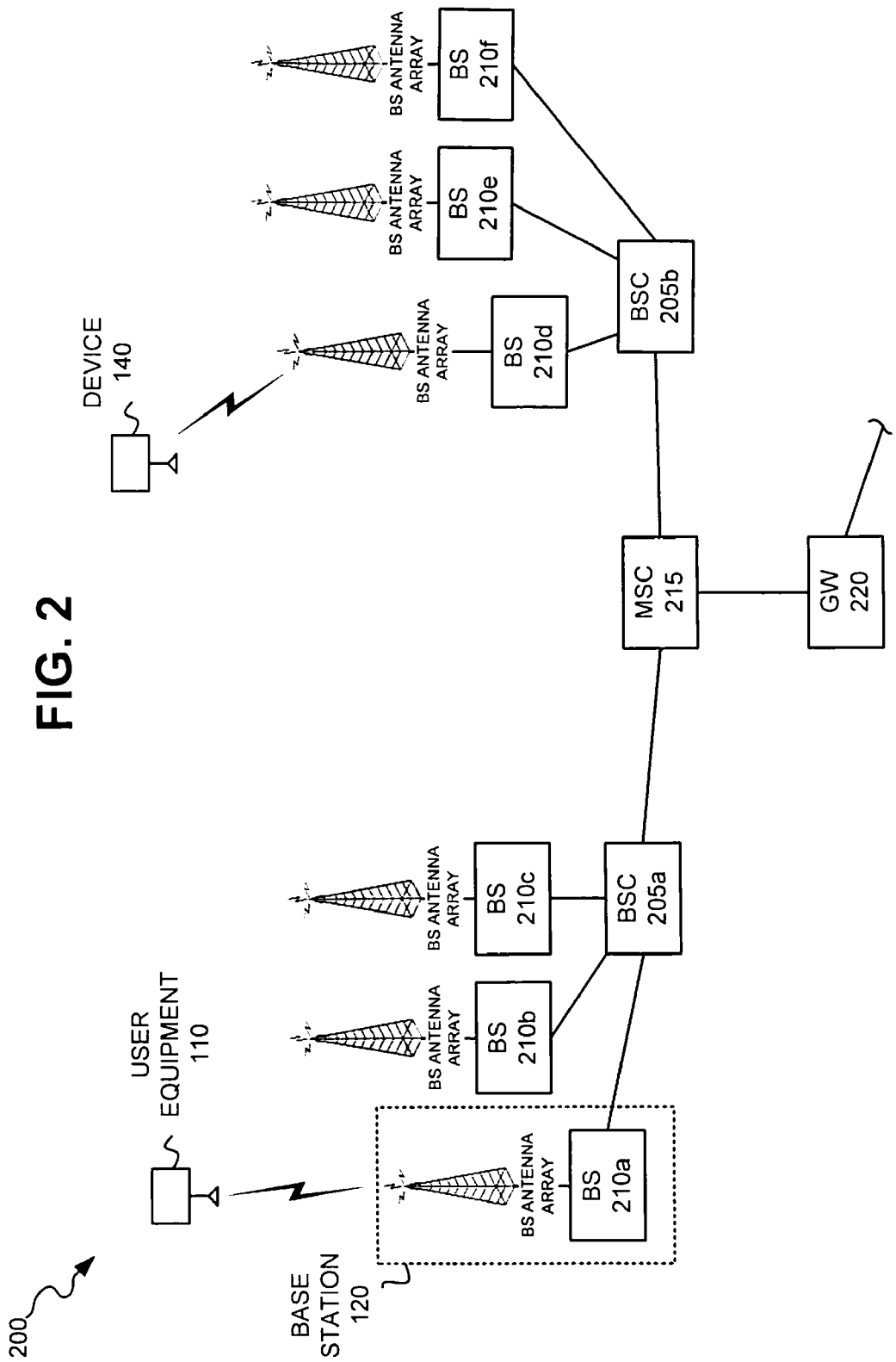
FIG. 2 illustrates an exemplary implementation in which a base station in a mobile network acts as the intermediate device of FIG. 1 and enables the devices to communicate with one another.

FIG. 2 illustrates an example of communication system 100 of FIG. 1, where network 130 includes a PLMN 200. As shown in FIG. 2. BS 120 may correspond to a base station of the PLMN 200 and UE 110 and device 140 may include cellular radiotelephones that are communicating with one another via PLMN 200.

PLMN 200 may include one or more base station controllers (BSCs) 205a-205b. multiple base stations (BSs) 210a-210f along with their associated antenna arrays, one or more mobile switching centers (MSCs), such as MSC 215, and one or more gateways (GWs), such as GW 220.

Base stations 210a-210f may format the data transmitted to, or received from, the antenna arrays in accordance with existing techniques and may communicate with BSCs 205a-205b or a device, such as UE 110. Among other functions, BSCs 205a-205b may route received data to either MSC 215 or a base station (e.g., BSs 210a-210c or 210d-210f). MSC 215 may route received data to BSC 205a or 205b. GW 220 may route data received from an external domain (not shown) to an appropriate MSC (such as MSC 215), or from an MSC to an appropriate external domain. For example, the external domain may include the Internet or a PSTN.

Figure 3A:
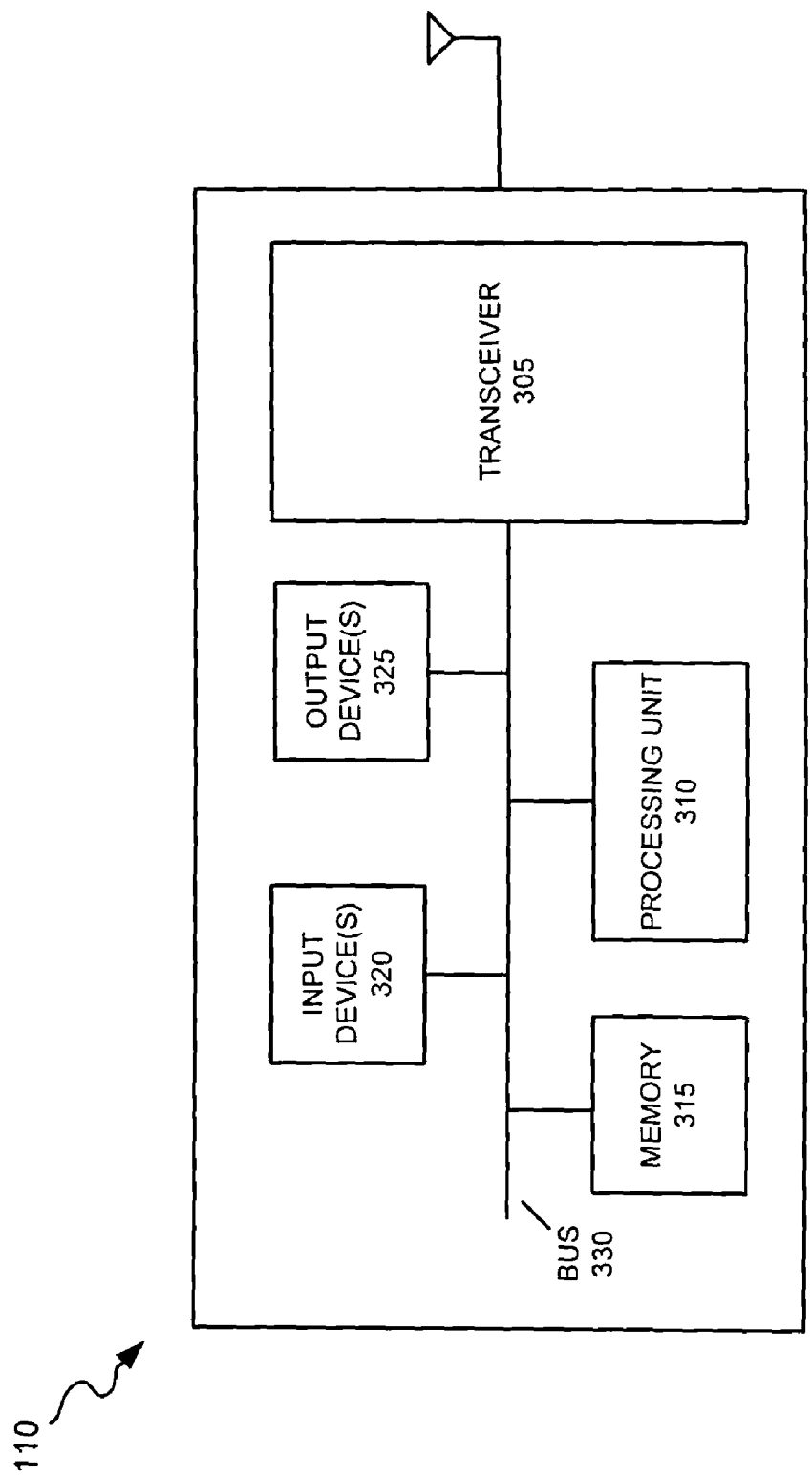
FIG. 3A illustrates exemplary components of the device of FIG. 1.

FIG. 3A illustrates UE 110 consistent with an exemplary embodiment. Device 140 may be similarly configured. UE 110 may include a transceiver 305, a processing unit 310, a memory 315, an input device(s) 320, an output device(s) 325, and a bus 330.

Transceiver 305 may include transceiver circuitry for transmitting and/or receiving symbol sequences using radio frequency signals via one or more antennas. Processing unit 310 may include a processor, microprocessor, or processing logic that may interpret and execute instructions. Processing unit 310 may perform data processing functions for inputting, outputting, and processing of data including data buffering and device control functions, such as call processing control, user interface control, or the like.

Memory 315 may provide permanent, semi-permanent, or temporary working storage of data and instructions for use by processing unit 310 in performing device processing functions. Memory 315 may include read only memory (ROM), random access memory (RAM), large-capacity storage devices, such as a magnetic and/or optical recording medium and its corresponding drive, or other types of memory devices. Input device(s) 320 may include mechanisms for entry of data into UE 110. For example, input device(s) 320 may include a key pad (not shown), a microphone (not shown) or a display unit (not shown). The key pad may permit manual user entry of data into UE 110. The microphone can include mechanisms for converting auditory input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 325 may include mechanisms for outputting data in audio, video and/or hard copy format. For example, output device(s) 350 may include a speaker (not shown) that includes mechanisms for converting electrical signals into auditory output. Output device(s) 325 may further include a display unit that displays output data to the user. For example, the display unit may provide a graphical user interface that displays output data to the user. Bus 330 may interconnect the various components of UE 110 to permit the components to communicate with one another.

The configuration of components of UE 110 illustrated in FIG. 3A is for illustrative purposes only. Other configurations with more, fewer, or a different arrangement of components may be implemented.

Figure 3B:
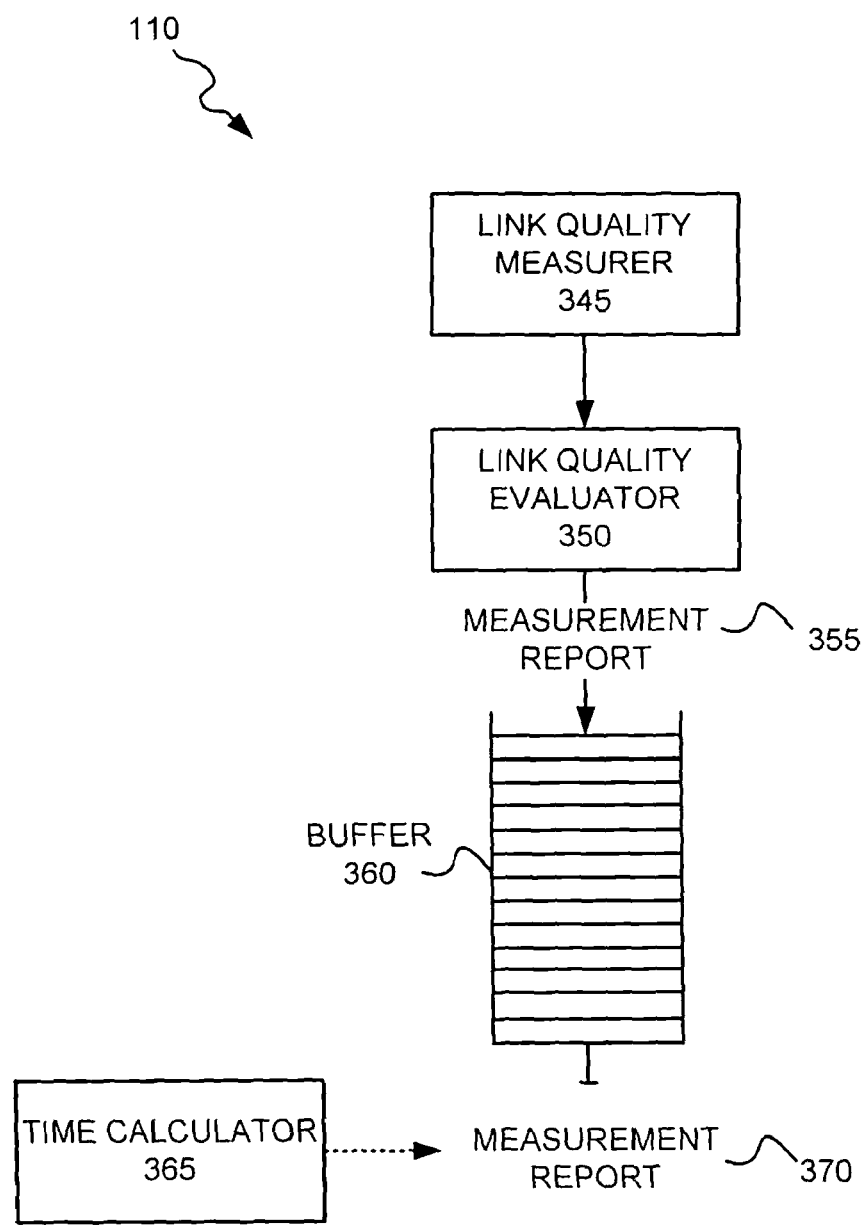
FIG. 3B illustrates an exemplary functional diagram of the user equipment of FIG. 1.

FIG. 3B illustrates an exemplary functional diagram of UE 110 that may perform operations that enable UE 110 to maintain a communication link with other devices and systems, such as PLMN 200. For example, as previously described, measurement reports may be utilized by BS 120 for, among other things, handover procedures. The functional components shown in FIG. 3B may be implemented by utilizing one or more of the components depicted in FIG. 3A. For example, link quality measured 345 and link quality evaluator 350 may be implemented in transceiver 305, buffer 360 may be implemented in memory 315, etc. In this way, UE 110 may generate measurement reports.

As shown in FIG. 3B, UE 110 may include a link quality measurer 345, a link quality evaluator 350, a buffer 360, and a time calculator 365 for maintaining a communication link with other devices and systems. Link quality measurer 345 may measure one or more characteristics of a radio link (e.g., signal strength, intra-frequency measurements, inter-frequency measurements, etc.). Link quality evaluator 350 may analyze these measurements (e.g., radio link values associated with a measurement). Based on the operations performed by link quality measurer 345 and link quality evaluator 350, a measurement report 355 may be generated. In one implementation, measurement report 355 may be generated based on a triggering condition (e.g., that a radio link value is below a threshold value or a radio link value is greater than a threshold value). In some instances, multiple measurement reports 355 may be generated, stored in a buffer 360, and queued for transmission.

Time calculator 365 may calculate times relating to the transmission of measurement reports 355. In one implementation, time calculator 365 may calculate a time periodicity in which to transmit measurement reports 355. Additionally, or alternatively, time calculator 365 may calculate a time corresponding to when measurement report 355 will be ready for transmission. Time calculator 365 will be described in greater detail below. A measurement report 370 may be transmitted based on a time calculated by time calculator 365.

Figure 3C:
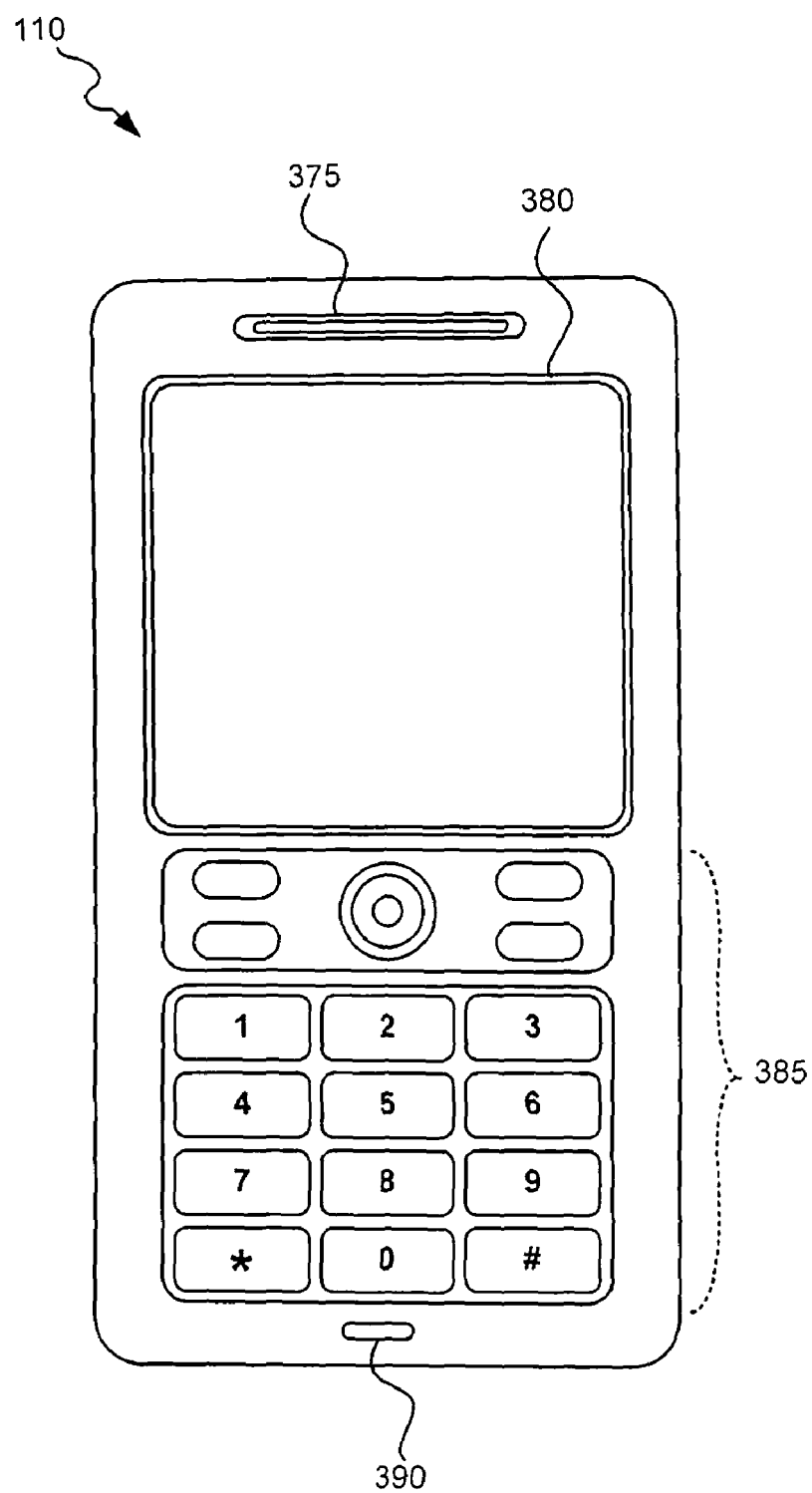
FIG. 3C illustrates an exemplary implementation of the device of FIG. 1 where the device is a cellular radiotelephone.

FIG. 3C illustrates an exemplary implementation of UE 110 in which UE 110 is a cellular radiotelephone. As shown in FIG. 3B, the cellular radiotelephone may include a microphone 390 (e.g., of input device(s) 320) for entering audio information into UE 110, a speaker 375 (e.g., of output device(s) 325) for providing an audio output from UE 110, a keypad 385 (e.g., of input device(s) 320) for manual entry of data or selection of device functions, and a display 380 (e.g., of input device(s) 320 or output device(s) 325) that may visually display data to a user or which may provide a user interface that the user may use to enter data or to select device functions (in conjunction with keypad 385).

Figure 4:
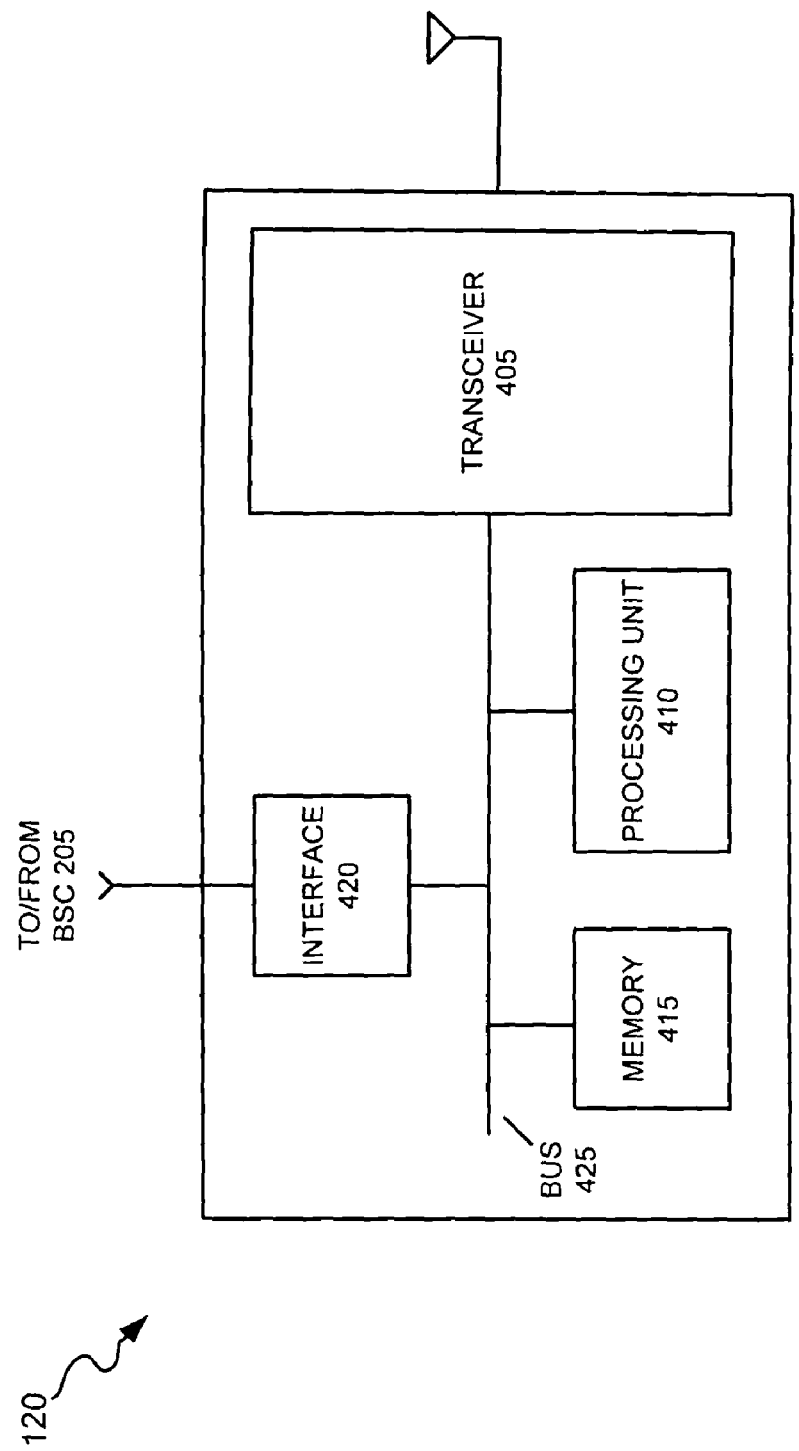
FIG. 4 illustrates exemplary components of the intermediate device of FIG. 1.

FIG. 4 illustrates one exemplary implementation of BS 120. BS 120 may include a transceiver 405, a processing unit 410, a memory 415, an interface 420 and a bus 425.

Transceiver 405 may include transceiver circuitry for transmitting and/or receiving symbol sequences using radio frequency signals via one or multiple antennas. Processing unit 410 may include a processor, microprocessor, or processing logic that may interpret and execute instructions. Processing unit 410 may perform all device data processing functions. Memory 415 may provide permanent, semi-permanent, or temporary working storage of data and instructions for use by processing unit 410 in performing device processing functions. Memory 415 may include read only memory (ROM), random access memory (RAM), large-capacity storage devices, such as a magnetic and/or optical recording medium and its corresponding drive, or other types of memory devices. Interface 420 may include circuitry for interfacing with a link that connects to a BSC (e.g., BSC 205a or BSC 205b). Bus 425 may interconnect the various components of BS 120 to permit the components to communicate with one another.

The configuration of components of BS 120 illustrated in FIG. 4 is for illustrative purposes only. Other configurations with more or fewer components, or a different arrangement of components, may be implemented.

Figure 5:
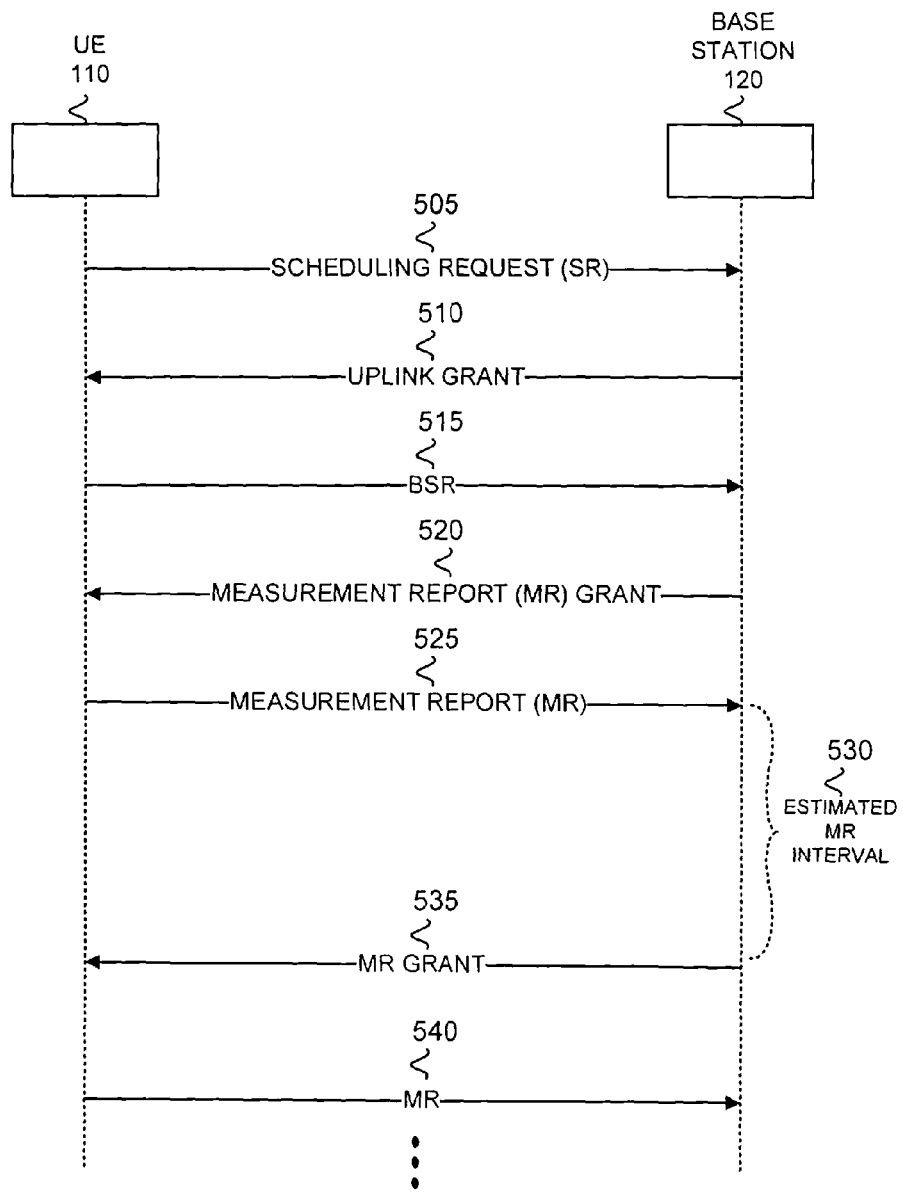
FIG. 5 illustrates an exemplary timing diagram representing messages exchanged between the base station and the user equipment according to an exemplary implementation.

FIG. 5 illustrates an exemplary timing diagram for transmitting measurement reports from UE 110 to BS 120. As illustrated, UE 110 may transmit a scheduling request 505 to BS 120. Scheduling request 505 may be transmitted on a dedicated scheduling request (SR) channel (D-SR), which may involve UE 110 establishing uplink (UL) synchronization and/or being assigned a D-SR (e.g. by BS 120), or on a contention-based channel (e.g., a random access SR channel (RA-SR)). UE 110 may transmit scheduling request 505 when UE 110 has data to transmit (e.g., a measurement report) in buffer 360. In response, BS 120 may transmit an uplink grant 510. Uplink grant 510 may include information regarding time and frequency resources UE 110 may utilize and information regarding the transport format (e.g., modulation, coding scheme, antenna scheme, block size, etc.). Subsequently, UE 110 may transmit other types of data (e.g., a buffer status report 515) to BS 120. BS 120 may transmit a measurement report grant 520 to UE 110. Measurement report grant 520 may include information regarding time and frequency resources to transmit a measurement report. UE 110 may transmit a measurement report 525 in accordance with the information in measurement report grant 520.

As previously described in connection with FIG. 3B, UE 110 may include a time calculator 365 for calculating a time periodicity in which to transmit measurement reports. For example, time calculator 365 may calculate the time periodicity to be every 20 milliseconds (ms), or some other time periodicity that is greater than or less than every 20 milliseconds. Additionally, BS 120 may have knowledge of the time periodicity and/or a time window in which UE 110 intends to transmit subsequent measurement reports. Based on this information, BS 120 may proactively schedule a measurement report grant, as illustrated by estimated measurement report interval 530 and the transmission of a measurement report grant 535. Additionally, or alternatively, other time estimation procedures may be employed, as described in greater detail in connection with FIG. 6B. UE 120 may transmit a measurement report 540 according to measurement report grant 535. As illustrated in FIG. 5, the transmission of measurement report grants and measurement reports may be repeated a number of times according to this concept.

Admittedly, there is a possibility that uplink resources may be wasted if, for example, UE 110 is not ready to transmit a measurement report, such as measurement report 540. In this instance, various schemes may be employed to address this issue. In one implementation, UE 110 may be prohibited from transmitting a scheduling request. Rather. UE 110 may have to wait for another measurement report grant to be received before transmitting the measurement report. In this regard, BS 120 may control the time when the measurement report grant is transmitted and control a risk that the measurement report is not ready for transmission by UE 110. In another implementation. UE 110 may transmit a scheduling request when the measurement report is ready for transmission. In such an instance. BS 120 may transmit the measurement report grant in response thereto. Alternatively, BS 120 may transmit the measurement report grant when it expects (e.g., based on a time estimation) the measurement report to be ready for transmission by UE 110 versus transmitting the measure report grant in response to the scheduling request. In this scheme, BS 120 may not guarantee to save scheduling request resources. Regardless of the scheme employed, BS 120 may transmit a measurement report grant that allots resources sufficient to transmit the expected measurement report.

It will be appreciated that UE 110 may have to actively monitor a channel in which measurement report grants are transmitted from BS 120. In some instances, this may require that UE 110 wake-up from a discontinuous reception (DRX) state (e.g., a sleep state or some other power saving state). Additionally, it will be appreciated that a delay for transmitting measurement reports may still exist based on, for example, the non-deterministic processing time for generating measurement reports at UE 110. To address this issue, a guard time may be used to account for this possible delay. In one implementation, the guard time may be approximately 5 ms. BS 120 may utilize the guard time when determining when to transmit the measurement report grants.

The channel over which the measurement report grants may be transmitted may depend on the communication standard employed. For example, in the LTE framework, BS 120 may transmit measurement report grants on a Physical Downlink Control Channel (PDCCH). In other communication standards, BS 120 may transmit measurement report grants on a different type of channel.

Additionally, BS 120 may configure measurement report grants based on different protocol layers of the communication standard. For example, in the LTE framework, BS 120 may configure measurement report grants on a layer three plane (e.g., the Radio Resource Control (RRC) layer). In such an implementation, BS 120 may employ a persistent resource allocation scheme (i.e., resources may be allocated for an undetermined duration of time). BS 120 may issue measurement report grants to UE 110 by transmitting the measurement report grants in, for example, a Medium Access Control (MAC) element.

It will be appreciated that if BS 120 employs the persistent resource allocation scheme, the issue of how to handle scheduling requests from UE 110 may need to be addressed. For example, in one implementation, UE 110 may be prohibited from transmitting a scheduling request when UE 110 has a valid grant no more than (e.g., T (ms) into the future). In this way, UE 110 may not waste resources by transmitting a scheduling request unnecessarily.

It will also be appreciated that while measurement reports are triggered at UE 110, in some instances, when the signal strength of a candidate cell no longer meets a triggering criteria (e.g., a threshold value), UE 110 may terminate the transmission of the measurement report. However, UE 110 may still utilize the uplink resources to transmit data other than the measurement report. In this regard, uplink resources may not be wasted. For example, depending on a UE scheduler (not illustrated), UE 110 may prioritize other types of data (e.g., a high priority message) to be transmitted before the triggered measurement report. UE 110 may request additional uplink resources to transmit the buffered measurement report, and thus transmit the measurement report according to a subsequent measurement report grant.

Regardless of the approach employed (i.e., proactive scheduling or persistent scheduling), measurement report grants may be transmitted based on a number of considerations, such as whether UE 110 has transmitted an initial measurement report, whether timing information regarding the next expected measurement report is known by BS 120, whether UE 110 has any pending grants for uplink resources close to the time of interest, and/or whether UE 110 utilized a previous measurement report grant to transmit a measurement report or some other data.

Figure 6A:
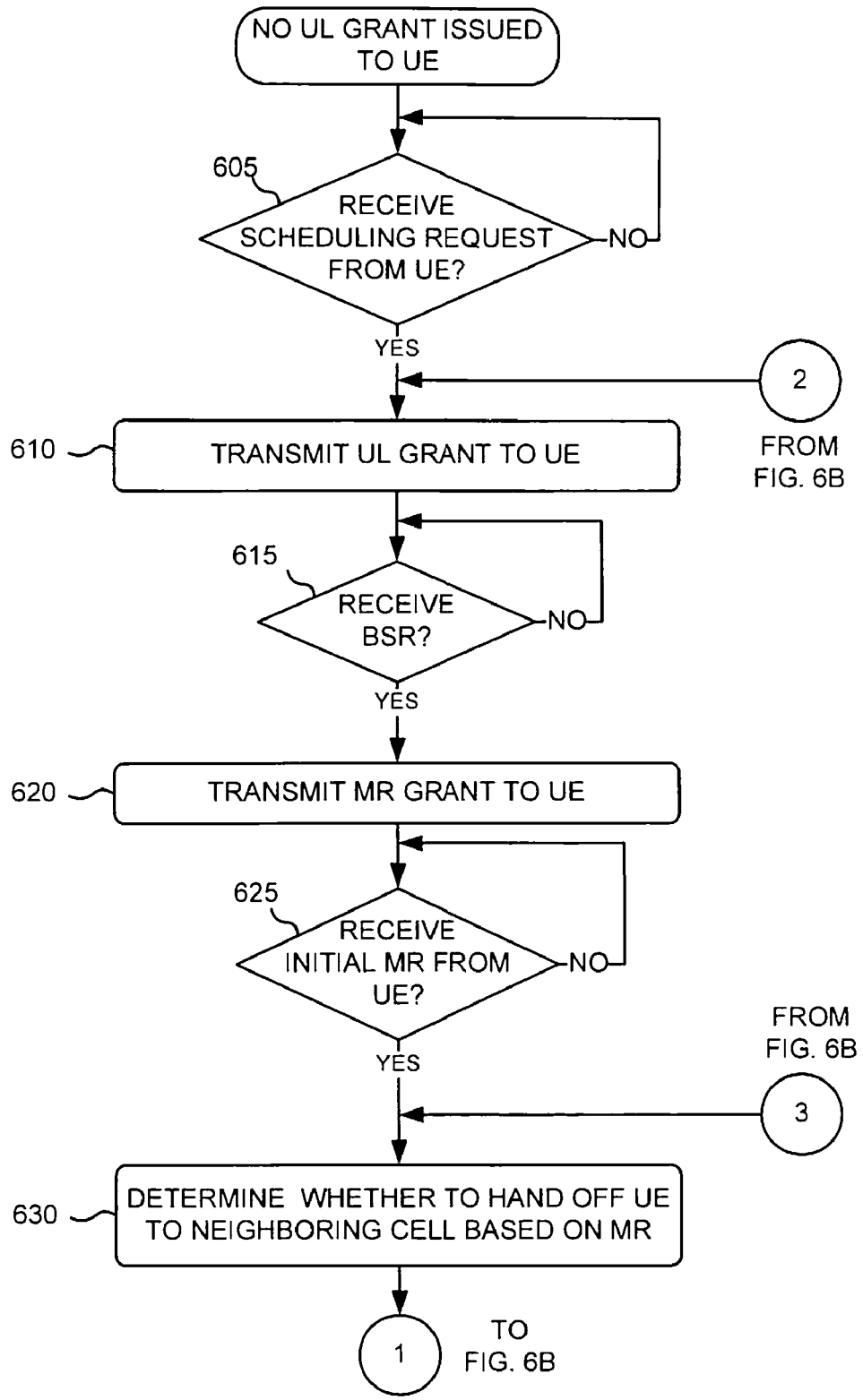
FIGS. 6A and 6B are flowcharts of an exemplary process for scheduling uplink resources.
Figure 6B:
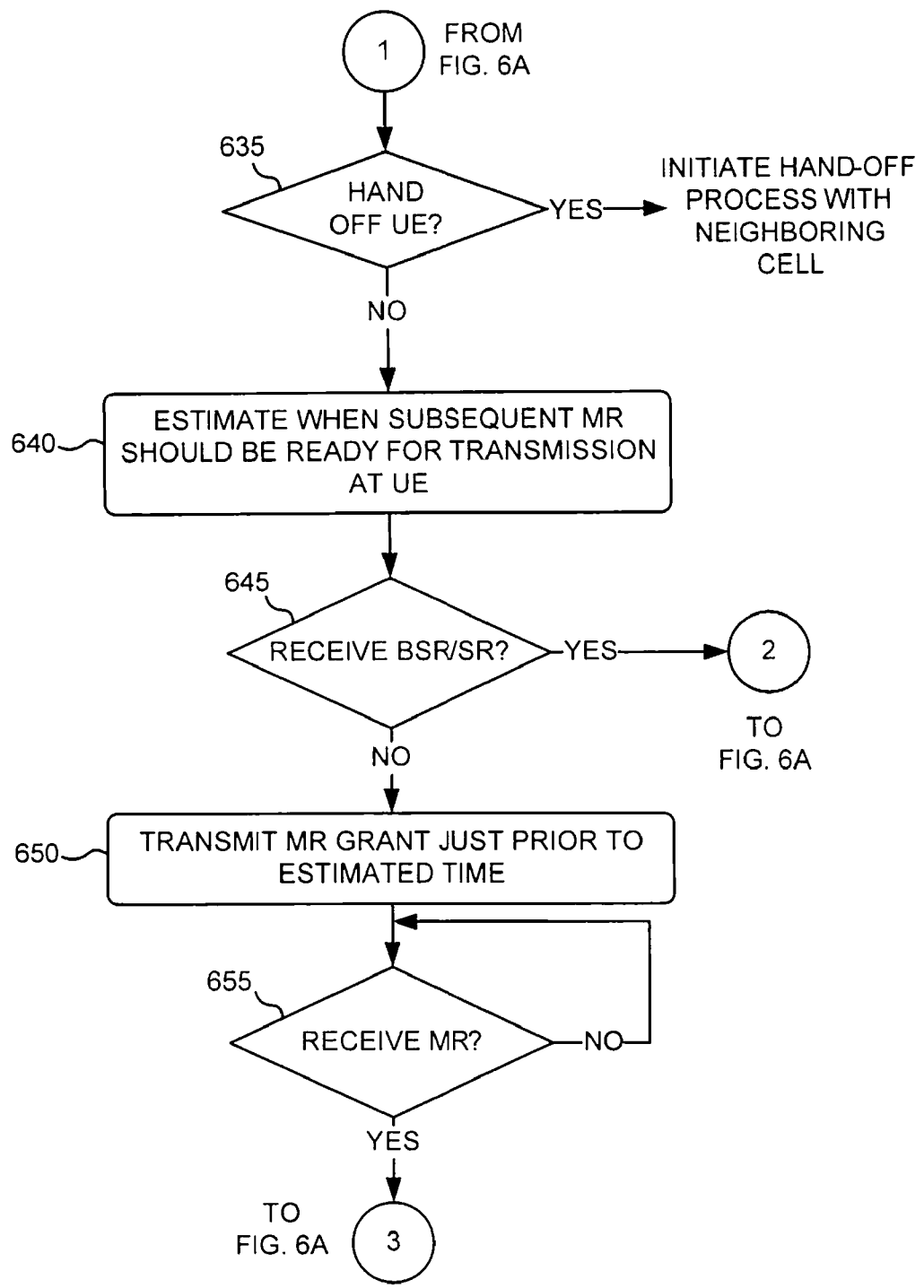

FIGS. 6A and 6B are flowcharts of an exemplary process for scheduling uplink resources to UE 110. The exemplary process of FIGS. 6A and 6B may, in one implementation, be implemented by BS 120.

The exemplary process may begin with an initial state where no uplink grant has been issued to UE 110. In such an instance, BS 120 may determine whether scheduling request 505 from UE 110 has been received (block 605). If BS 120 determines that scheduling request 505 from UE 110 has not been received (block 605—NO), then BS 120 may continue to wait. Alternatively, if BS 120 determines that scheduling request 505 has been received (block 605—Yes), then BS 120 may transmit uplink grant 510 to UE 110.

BS 120 may determine whether buffer status report 515 has been received (block 615). If BS 120 determines that buffer status report 515 from UE 110 has not been received (block 615—NO), then BS 120 may continue to wait. Alternatively, if BS 120 determines that buffer status report 515 from UE 110 has been received (block 615—YES), then BS 120 may transmit measurement report grant 520 to UE 110 (block 620).

Figure 7:
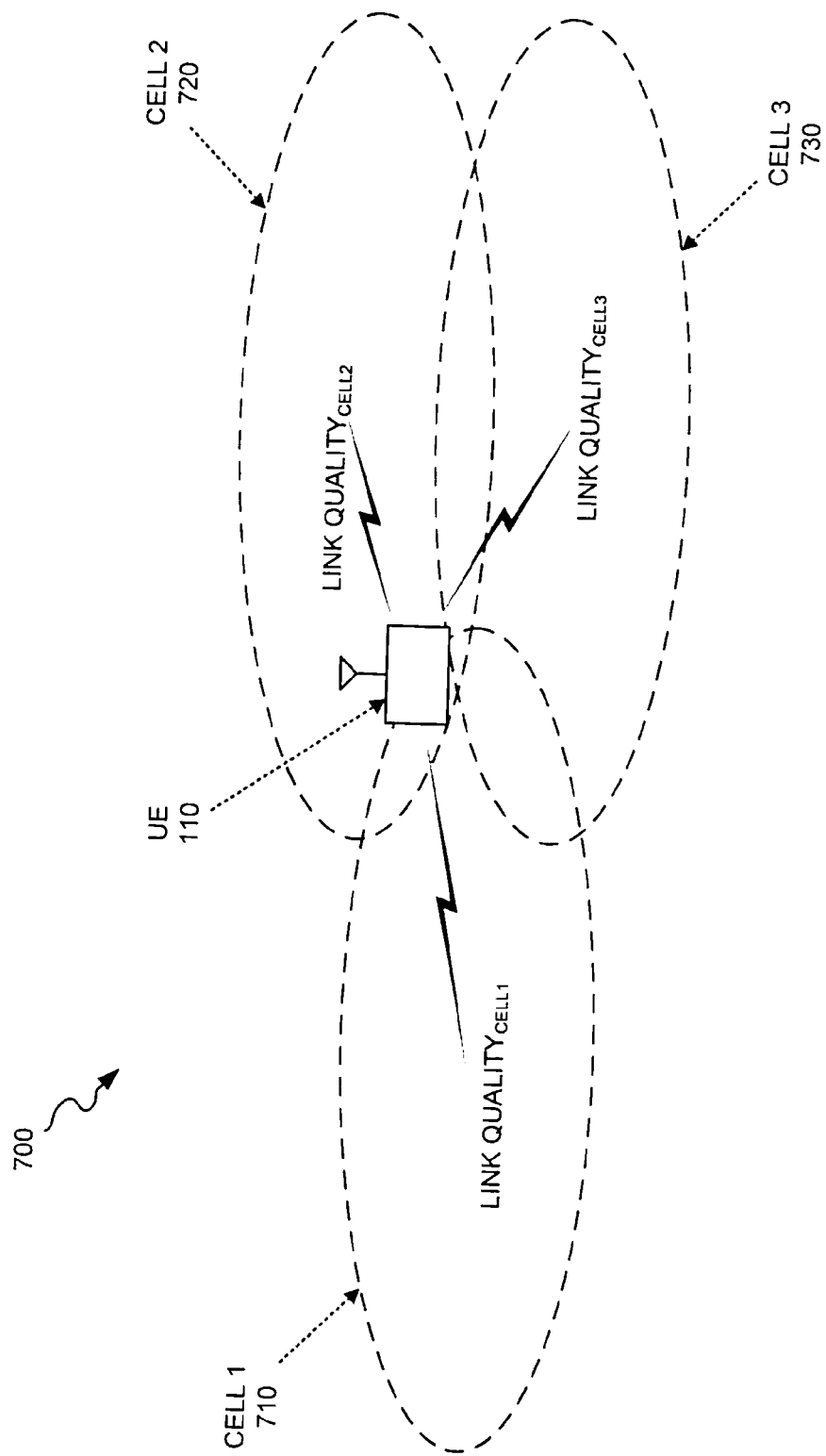
FIG. 7 illustrates the user equipment obtaining link quality measurements from multiple cells of the mobile network.

BS 120 may determine whether an initial measurement report 525 from UE 110 has been received (block 625). If BS 120 determines that initial measurement report 525 from UE 110 has not been received (block 625—NO), then BS 120 may continue to wait. Alternatively, if BS 120 determines that initial measurement report 525 from UE 110 has been received (block 625—YES), then BS 120 may determine whether to hand-off UE 110 to a neighboring cell based on the information included in initial measurement report 525 (block 630). If BS 120 determines to hand-off UE 110 (block 635—YES), then BS 120 may initiate a hand-off process with a neighboring cell. For example, as illustrated in FIG. 7. UE 110 may obtain link quality information from multiple cells, such as cell (1) 710, cell (2) 720, and cell (3) 730, which may be included in initial measurement report 525. BS 120 may initiate a hand-off process with cell (1) 710, cell (2) 720 or cell (3) 730 depending on which cell provides the best communication link with UE 110.

Alternatively, if BS 120 determines not to hand-off UE 110 to a neighboring cell (block 635—NO), then BS 120 may calculate when a subsequent measurement report should be ready for transmission at UE 110 (block 640). For example, as previously described, BS 120 may have knowledge of a time periodicity in which UE 110 intends to transmit subsequent measurement reports. Additionally, or alternatively, other approaches may be employed. For example, BS 120 may estimate the time when the initial measurement report (e.g., measurement report 525) was ready for transmission at UE 110 by considering if scheduling request 505 was received on a D-SR or a RA-SR, the periodicity of these transmissions (e.g., scheduling requests and/or initial measurement reports), etc. Additionally, or alternatively, UE 110 may include a timestamp with measurement report 525 and/or subsequent measurement reports. For example, the timestamp may include information indicating when measurement report 525 was ready for transmission versus when measurement report 525 was actually transmitted by UE 110. BS 120 may estimate when the subsequent measurement report should be ready for transmission at UE 110 based on this information. UE 110 may also include a timestamp indicating when measurement report 525 was actually transmitted. BS 110 may estimate when the subsequent measurement report should be ready for transmission based on these timestamps. Additionally, or alternatively, BS 120 may estimate the timestamp for measurement report 525 and/or subsequent measurement reports. BS 120 may adjust a time estimation corresponding to when a subsequent measurement report should be ready for transmission based on future messages (e.g., scheduling requests, buffer status reports, measurement reports, etc.) received from UE 110.

BS 120 may determine whether a buffer status report and/or a scheduling request has been received (block 645). If BS 120 determines that a buffer status report and/or a scheduling request has been received (block 645—YES), then the exemplary process may return to (block 610). Alternatively, if BS 120 determines that a buffer status report and/or a scheduling request has not be received (block 645—NO), then BS 120 may transmit measurement report grant 535 prior to the time at which it is calculated or estimated that UE 110 may transmit the subsequent measurement report 540 (block 650). In one implementation, BS 120 may employ a guard time when transmitting measurement report grant 535 to allow for delays at UE 110 in transmitting measurement report 540.

BS 120 may determine whether the (subsequent) measurement report 540 has been received (block 655). If BS 120 determines that measurement report 540 has not been received (block 655—NO), then BS 120 may continue to wait. Alternatively, if BS 120 determines that measurement report 540 has been received (block 655—YES), then the exemplary process may return to block 630.

Although FIGS. 6A-6B illustrate blocks of an exemplary process, in other implementations, fewer, additional, or different blocks may be included in the process of FIGS. 6A and 6B. Further, it will be appreciated that while it has been described that BS 120 may enter a waiting period (e.g., in (block 605), (block 615). etc.), BS 120 may be performing other operations not specifically described.

Figure 8:
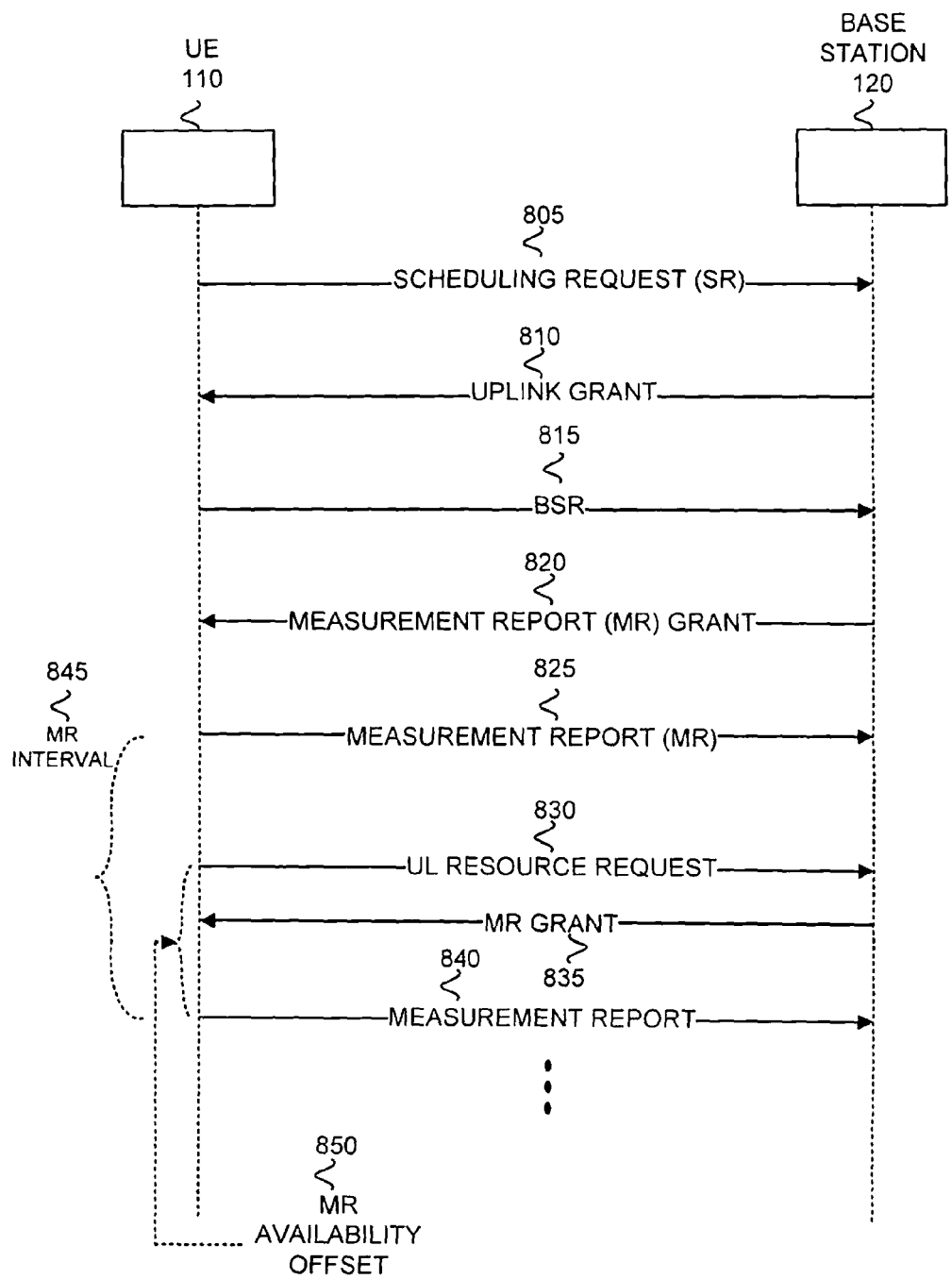
FIG. 8 illustrates another exemplary timing diagram representing messages exchanged between the base station and the user equipment according to another exemplary implementation.

FIG. 8 illustrates another exemplary timing diagram for transmitting measurement reports from UE 110 to BS 120. As illustrated, UE 110 may transmit a scheduling request 805 to BS 120. Scheduling request 805 may be transmitted on a (D-SR), which may involve UE 110 establishing uplink synchronization and/or being assigned a D-SR (e.g., by BS 120), or on a contention-based channel (e.g., a RA-SR). UE 110 may transmit scheduling request 805 when UE 110 has data to transmit (e.g., a measurement report) in buffer 360. In response, BS 120 may transmit an uplink grant 810. Uplink grant 810 may include information regarding time and frequency resources UE 110 may utilize and information regarding the transport format (e.g., modulation, coding scheme, antenna scheme, block size, etc.). Subsequently, UE 110 may transmit other types of data (e.g., a buffer status report 815) to BS 120. BS 120 may transmit a measurement report grant 820 to UE 110. Measurement report grant 820 may include information regarding time and frequency resources to transmit a measurement report. UE 110 may transmit a measurement report 825 according to measurement report grant 820.

Subsequently, UE 110 may transmit an uplink resource request 830 to BS 120. However, UE 110 may transmit uplink resource request 830 at a time prior to when a subsequent measurement report 840 is ready for transmission. For example, for purposes of discussion, assume that for UE 110 to generate uplink resource request 830, transmit uplink resource request 830 to BS 120, receive measurement report grant 835 from BS 120, decode measurement report grant 835, and have measurement report 840 ready for transmission takes 15 milliseconds. In this case, UE 110 may transmit uplink resource request 830 to BS 120 at least 15 milliseconds prior to the moment when measurement report 840 in buffer 360 is ready for transmission, as illustrated by measurement report availability offset 850. In other words, UE 110 may estimate a time when the measurement report 840 will be ready for transmission, and transmit uplink resource request 830 to BS 120 based on this estimated time. Thus, a delay equivalent to an estimate of this portion of the scheduling request procedure may be subtracted, and a time interval between the transmissions of measurement reports may be shortened, as illustrated by measurement report interval 845. Additionally, the offset may help ensure that a "fresh" measurement report is delivered to BS 120.

It will be appreciated that the offset having a value of 15 ms is exemplary. For example, the offset may have a value in a range, such as 5 ms to 18 ms. However, the offset may have a value outside the range of 5 ms to 18 ms. Additionally, or alternatively, depending on how the offset is determined and/or configured in UE 110, the offset may be a static value or a dynamic value. For example, the offset may be a dynamic value that may be adjusted by UE 110 according to, among other things, network conditions, previous tries and outcomes. etc. Additionally, it is to be understood that the offset may be configured at one of the upper layers of a protocol stack (e.g., layer two, layer three. etc.).

BS 120 may transmit a measurement report grant 835 to UE 110. UE 120 may transmit a measurement report 840 according to measurement report grant 835. As illustrated in FIG. 8, the transmission of measurement report grants and measurement reports may be repeated a number of times according to this concept.

Figure 9A:
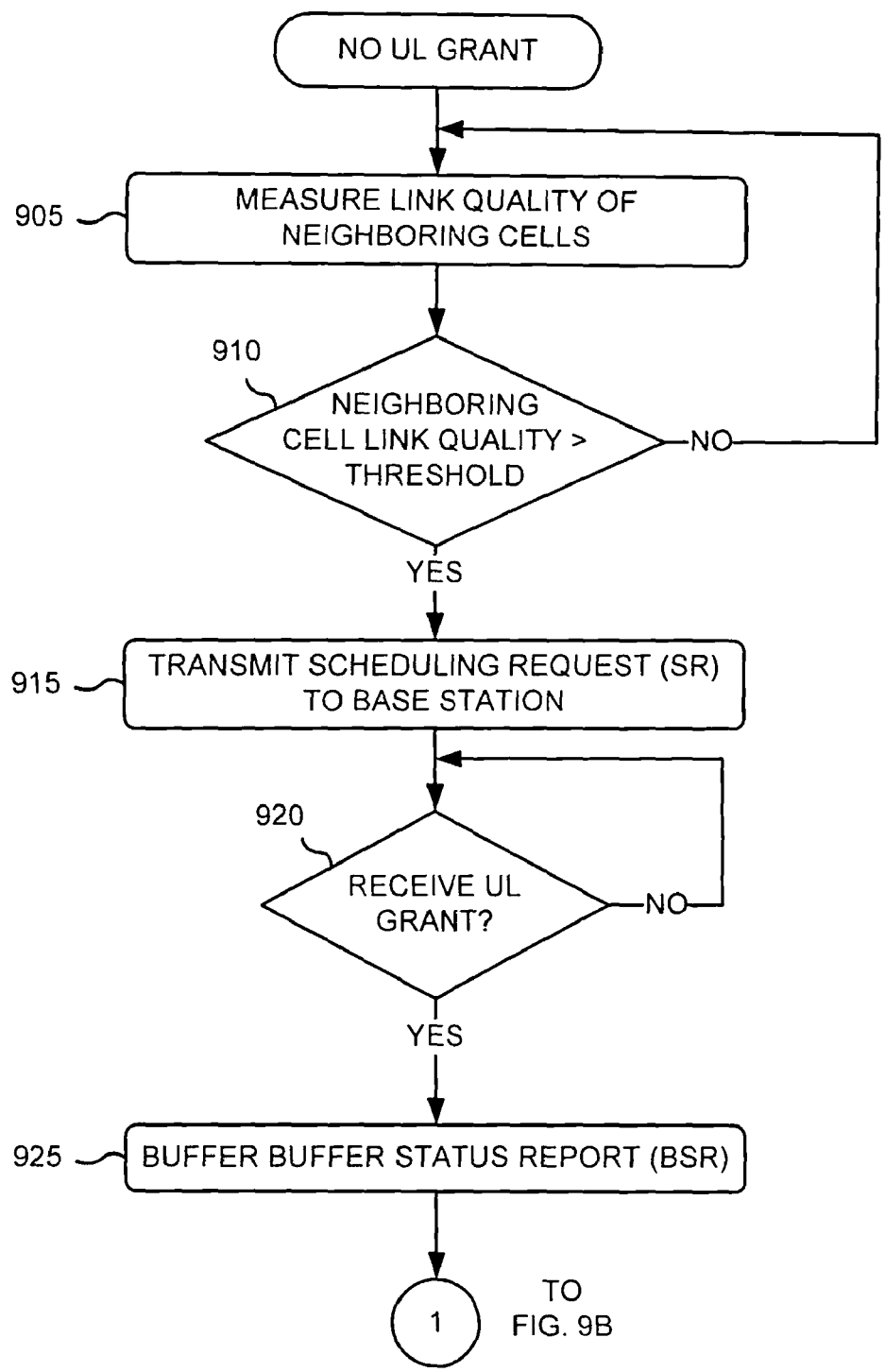
FIGS. 9A-9C are flowcharts of another exemplary process for scheduling uplink resources.
Figure 9B:
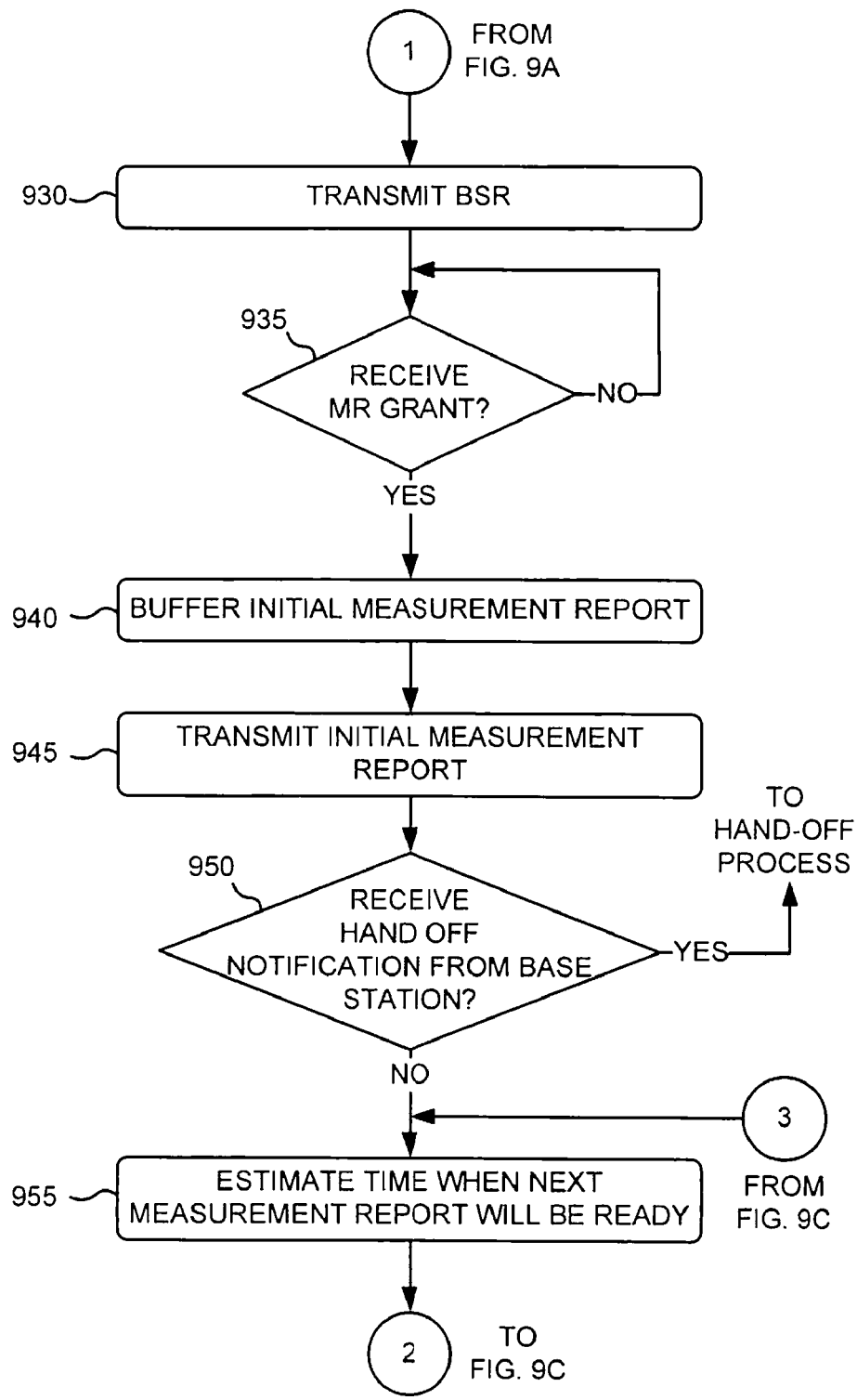
Figure 9C:
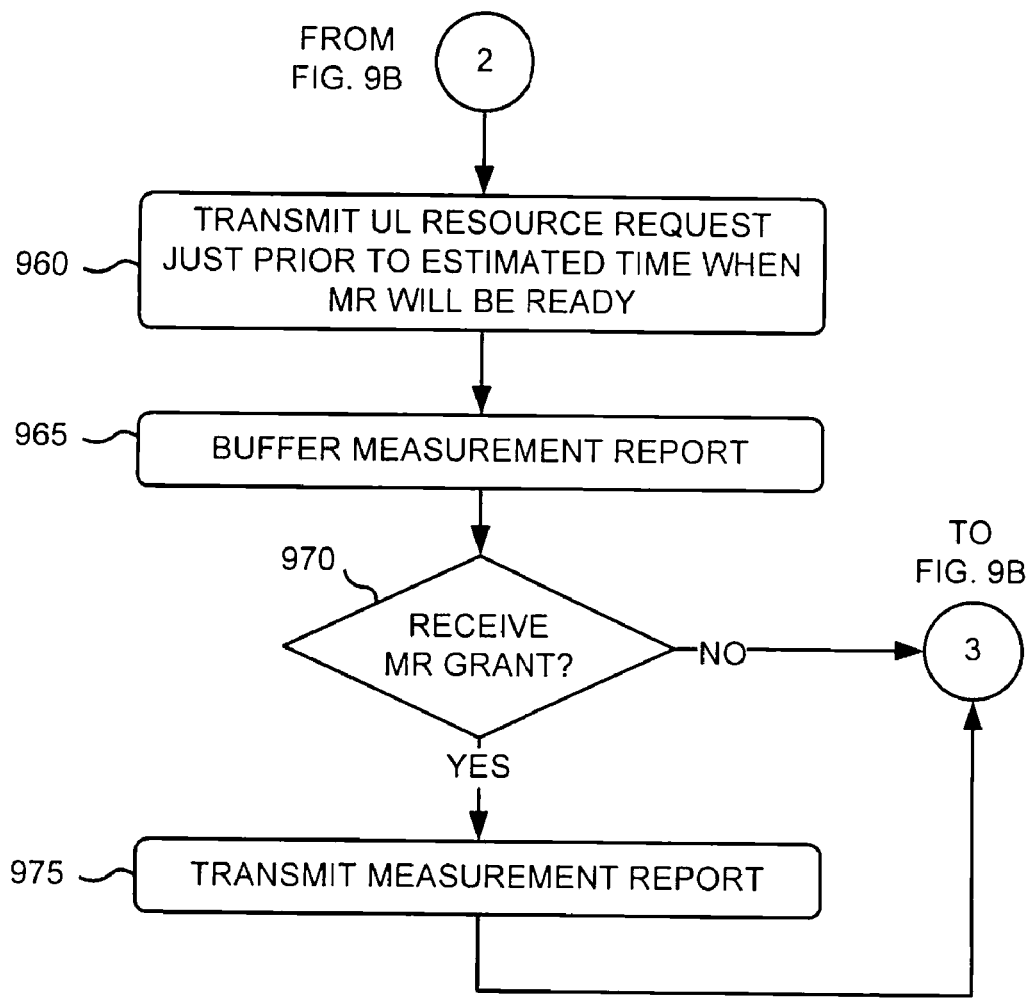

FIGS. 9A-9C are flowcharts of another exemplary process for scheduling uplink resources to UE 110. The exemplary process of FIGS. 9A-9C may, in one implementation, be implemented by UE 110.

The exemplary process may begin with an initial state where no uplink grant has been issued to UE 110. In such an instance, UE 110 may obtain link quality measurements (e.g., link quality measurer 345) from neighboring cells, as previously described in connection with FIG. 7 (block 905). UE 110 may determine whether a triggering condition exists (e.g., link quality evaluator 350), such as whether a neighboring cell link quality measurement is greater than a threshold value) (block 910). If UE 110 determines that a triggering condition does not exist (block 910—NO), then UE 110 may perform additional link quality measurements. Alternatively, if UE 110 determines that a triggering condition exists (e.g., that a neighboring cell link quality measurement is greater than a threshold value) (block 910—YES), then UE 110 may transmit scheduling request 905 to BS 120 (block 915).

Subsequently, UE 110 may determine whether it has received uplink grant 815 (block 920). If UE 110 determines that it has not received uplink grant 810 (block 920—NO), then UE 110 may continue to wait. Alternatively, if UE 110 determines that it has received uplink grant 810 (block 920—YES), then UE 110 may buffer additional data (e.g., buffer status report 815) (block 925) and then transmit buffer status report 815 to BS 120 (block 930).

UE 110 may determine whether it received measurement report grant 820 from BS 120 (block 935). If UE 110 determines that is has not received measurement report grant 820 (block 935—NO), then UE 110 may continue to wait. Alternatively, if UE 110 determines that it has received measurement report grant 820 (block 935—YES), then UE 110 may buffer initial measurement report 825 (e.g., in buffer 360) (block 940) and transmit measurement report 825 to BS 120 (block 945).

UE 110 may determine whether it received a hand-off notification from BS 120 (block 950). If UE 110 determines that it has received a hand-off notification from BS 120 (block 950—YES), then UE 110 may implement a hand-off process in conjunction with BS 120 and the base station of the neighboring cell. Alternatively, if UE 110 determines that it has not received a hand-off notification from BS 120 (block 950—NO), then UE 110 may estimate a time (e.g., time calculator 365) when a next measurement report will be ready for transmission (block 955). For example, as previously described in connection with FIG. 8, the estimated time in which a next measurement report will be ready for transmission may be based on an offset. The offset may be a static value or a dynamic value.

UE 110 may transmit uplink resource request 830 at a time prior to when subsequent measurement report 840 will be ready for transmission (block 960). For example, as previously described in connection with FIG. 8, UE 110 may transmit uplink resource request 830 to BS 120 at a time prior, which corresponds to the offset (e.g., by time calculator 365), to when measurement report 840 is ready for transmission.

UE 110 may buffer the subsequent measurement report 840 (e.g., in buffer 360) (block 965). UE 110 may determine whether it received measurement report grant 840 (block 970). If UE 110 determines that it did not receive measurement report grant 840 from BS 120 (block 970—NO), UE 110 may continue to wait or the exemplary process may return to (block 955). Alternatively, if UE 110 determines that it did receive measurement report grant 840 (block 970—YES), UE 110 may transmit measurement report 840 to BS 120 (block 975).

Although FIGS. 9A-9C illustrate blocks of an exemplary process, in other implementations, fewer, additional, or different blocks may be included in the process of FIGS. 9A-9C. Further, it will be appreciated that while it has been described that UE 110 may enter a waiting period (e.g., in block 920, block 935, etc.), UE 110 may be performing other operations not specifically described.

As a result of the concepts described herein, handover procedures may be initialized at an earlier time which may improve service performance as well as radio resource utilization in a wireless communication system.

The foregoing description of implementations provides illustration, but is not intended to be exhaustive or to limit the implementations to the precise form disclosed. Modifications and variations are possible in light of the above teachings or may be acquired from practice of the teachings. For example, UE 110 may associate each measurement report with a timestamp (e.g., a "best-before" stamp). In this way, if a measurement report remains un-transmitted in UE 110 for a period of time that exceeds a time associated with the timestamp, UE 110 may discard the measurement report. Additionally, or alternatively, if a measurement report is queued in buffer 360 of UE 110 when a subsequent measurement report arrives in buffer 360, UE 110 may discard the queued measurement report. Additionally, or alternatively, UE 110 may discard the queued measurement report if the arriving measurement report is of the same measurement type. For example, UE 110 may assign a measurement identifier that indicates a type of measurement report to each measurement report. In this way, UE 110 may determine whether the arriving measurement report is of the same measurement type as the queued measurement report.

In addition, while series of blocks have been described with regard to processes illustrated in FIGS. 6A-6B and 9A-9C, the order of the blocks may be modified in other implementations. Further, non-dependent blocks may be performed in parallel. Further one or more blocks may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

The invention claimed is:

1. A method for scheduling link quality measurement reports associated with one or more cells of a wireless network wherein the method is implemented in a base station, the method comprising:
    estimating at the base station a first time at which a first link quality measurement report will be available at a user equipment;
    scheduling transmission of the first link quality measurement report from the user equipment to the base station based on the first estimated time, wherein scheduling the transmission of the first link quality measurement report comprises, transmitting, just prior to the first estimated time, a grant of uplink resources from the base station to the user equipment to enable the user equipment to transmit the link quality measurement report to the base station on an uplink channel;
    estimating at the base station a second time at which a second link quality measurement report will be available at the user equipment, where the second estimated time at which the second link quality measurement report will be available is based on a time interval between the first link quality measurement report and the second link quality measurement report; and
    scheduling at the base station transmission of the second link quality measurement report from the user equipment to the base station based on the second estimated time.

2. The method of claim 1, where the time interval is a periodic time interval.

3. The method of claim 1, where the estimating the second time at which the second link quality measurement report will be available at the user equipment comprises:
    receiving the first link quality measurement report; and
    calculating the second estimated time based on a first timestamp and a second time stamp associated with the first link quality measurement report, where the first timestamp indicates when the first link quality measurement report was ready for transmission by the user equipment, and the second timestamp indicates when the first link quality measurement report was transmitted by the user equipment.

4. The method of claim 1, where the estimating the second time at which the second link quality measurement report will be available at the user equipment comprises:
   receiving the first link quality measurement report; and
   calculating the second estimated time based on whether the first link quality measurement report was preceded by a resource request on a dedicated channel or on a random access channel.

5. The method of claim 1, where the first link quality measurement report includes data associated with link qualities of the one or more cells that are in proximity to the user equipment.

6. The method of claim 5, where the link qualities comprise signal strengths associated with the one or more cells.

7. The method of claim 1, where the grant of uplink resources is transmitted via a downlink control channel.

8. The method of claim 1, where the grant of uplink resources is transmitted via a control message sent from the base station to the user equipment.

9. The method of claim 8, where the control message comprises a medium access control (MAC) message.

10. The method of claim 8, where the control message comprises a radio resource control (RRC) message.

11. The method of claim 1, A method for scheduling link quality measurement reports associated with one or more cells of a wireless network wherein the method is implemented in a user equipment and, the method comprising:
    estimating at the user equipment a first time at which a first link quality measurement report will be available at the user equipment;
    scheduling transmission of the first link quality measurement report from the user equipment to a base station based on the first estimated time, wherein scheduling the transmission of the first link quality measurement report comprises,
       transmitting an uplink resource request just prior to the first estimated time from the user equipment to the base station; station, and
       transmitting the first link quality measurement report to the base station based on whether an uplink grant is received at the user equipment in response to the uplink resource request;
    estimating at the user equipment a second time at which a second link quality measurement report will be available at the user equipment, where the second estimated time at which the second link quality measurement report will be available is based on a time interval between the first link quality measurement report and the second link quality measurement report; and
    scheduling transmission of the second link quality measurement report from the user equipment to the base station based on the second estimated time.

12. The method of claim 11 further comprising:
    buffering the first link quality measurement report in a buffer; and
    retrieving the first link quality measurement report from the buffer for transmission based on whether the uplink grant is received at the user equipment.

13. The method of claim 12, further comprising:
    measuring link qualities associated with one or more cells of the wireless network;
    comparing the measured link qualities with at least one link quality threshold,
    where buffering the first link quality measurement report is based on the comparison of the measured link qualities.

14. The method of claim 12, further comprising:
    associating a time value with the buffered first link quality measurement report; and
    discarding the buffered first link quality measurement report if the report remains stored in the buffer for a period exceeding the time value.

15. The method of claim 12, further comprising:
    buffering a second link quality measurement report in the buffer; and
    discarding the first link quality measurement report if the first link quality measurement report remains stored in the buffer at the time the second link quality measurement report is buffered.

16. The method of claim 12, further comprising:
    buffering a second link quality measurement report in the buffer; and
    discarding the first link quality measurement report if a measurement type of the first link quality measurement report is the same as a measurement type of the second link quality measurement report.

17. A system, implemented in a base station associated with a wireless network, for scheduling link quality measurement reports associated with one or more cells of the wireless network, the system comprising:
    a unit in the base station configured to estimate a first time at which a first link quality measurement report will be available at a user equipment;
    a unit in the base station configured to schedule transmission of the first link quality measurement report from the user equipment to the base station based on the first estimated time, wherein scheduling the transmission of the first link quality measurement report comprises, initiating the transmission, just prior to the first estimated time, a grant of uplink resources from the base station to the user equipment to enable the user equipment to transmit the link quality measurement report to the base station on an uplink channel:
    a unit in the base station configured to estimate a second time at which a second link quality measurement report will be available at the user equipment, where the second estimated time at which the second link quality measurement report will be available is based on a time interval between the first link quality measurement report and the second link quality measurement report; and
    a unit in the base station configured to schedule at the base station transmission of the second link quality measurement report from the user equipment to the base station based on the second estimated time.

18. A system, implemented in user equipment associated with a wireless network, for scheduling link quality measurement reports associated with one or more cells of the wireless network, the system comprising:
    an estimator configured to estimate a first time at which a first link quality measurement report will be available for transmission from the user equipment;
    a unit configured to, schedule transmission of the first link quality measurement report from the user equipment to a base station based on the first estimated time, wherein scheduling the transmission of the first link quality measurement report comprises,
       initiating the transmission of an uplink resource request just prior to the first estimated time from the user equipment to the base station, and initiating the transmission of the first link quality measurement report to the base station based on whether an uplink grant is received at the user equipment in response to the uplink resource request;

a unit configured to estimate a second time at which a second link quality measurement report will be available at the user equipment, where the second estimated time at which the second link quality measurement report will be available is based on a time interval between the first link quality measurement report and the second link quality measurement report; and a unit configured to schedule transmission of the second link quality measurement report from the user equipment to the base station based on the second estimated time.

* * * * *